Oct. 19, 1965   G. E. CRAIN ETAL   3,213,006
ELECTROLYTIC PROCESS FOR THE RECOVERY OF MERCURY
Filed Oct. 23, 1961
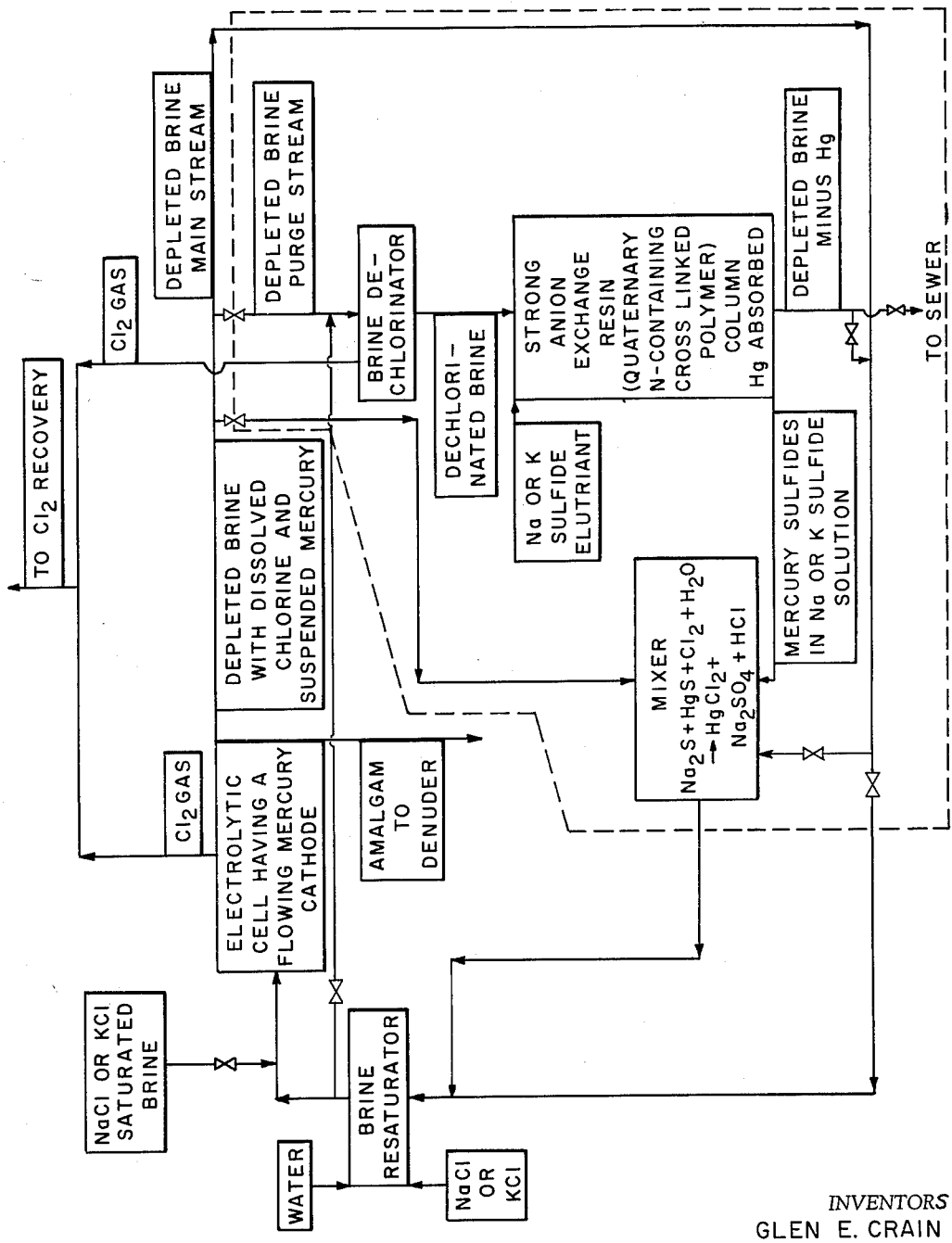
*INVENTORS*
GLEN E. CRAIN
RICHARD H. JUDICE
BY *Warburton and Cross*
ATTORNEYS

United States Patent Office 3,213,006
Patented Oct. 19, 1965

3,213,006
ELECTROLYTIC PROCESS FOR THE RECOVERY
OF MERCURY
Glen E. Crain and Richard H. Judice, both of Houston,
Tex., assignors to Diamond Alkali Company, Cleveland, Ohio, a corporation of Delaware
Filed Oct. 23, 1961, Ser. No. 146,773
8 Claims. (Cl. 204—99)

This invention relates to a method of recovering mercury from the effluent brine from an electrolytic, flowing mercury cathode cell, wherein the effluent brine from such cathode cell comprises primarily an alkali metal halide brine, and more particularly relates to an improvement in the recovery of mercury from such effluent by adsorptive contact with a strong anion exchange organic resin of the quaternary ammonium, cross-linked type.

In the operation of an electrolytic flowing mercury cathode cell, the electrolyte, e.g., sodium chloride brine, in passing through the cell, becomes contaminated with small quantities, e.g., up to about 15 p.p.m., of mercury. Thus, the depleted brine effluent of such electrolytic cell contains mercury in some form, either as a suspension or as a dissolved compound. From the nature of the environment in which the mercury is found, i.e., in an aqueous solution of chlorine in a relatively concentrated chloride brine, it is reasonable to expect that the mercury probably takes the form of a double salt, or complex, to which may be attributed the empirical formula, $Na_2HgCl_4$.

In general, it is the practice to resaturate this depleted brine effluent with solid sodium chloride and, thereafter, recycle it into the electrolytic flowing mercury cathode cell, wherein it is once again subjected to electrolysis. In so doing, there is a gradual buildup of undesirable impurities in the brine, particularly impurities of magnesium, calcium, iron, and sulfate. In order to maintain these impurities at a level which can be tolerated by the cell, a portion of the depleted brine effluent from the cell, generally about a third, is separated from the main depleted brine stream, dechlorinated, and subjected to purification treatments so as to remove, as by precipitation, the major portion of these undesirable impurities. It is believed, however, that at least some of the mercury, present in the portion of the depleted brine effluent so treated, as the complex $Na_2HgCl_4$, is also precipitated. Although the actual mercury content of the depleted brine effluent is quite small, because of the quantities of brine which are thus handled, the total amount of mercury lost by precipitation with the other impurities, in the course of a day's operation, is appreciable.

While in some instances in the operation of an electrolytic flowing mercury cathode cell no attempt is made to resaturate the depleted brine effluent and recycle it to the cell, the effluent being discarded after one pass through the cell, it is apparent that even here there is a problem presented by the small amounts of mercury which are contained in this brine effluent. The disposal of this mercury-containing brine represents a considerable loss in terms of the mercury which is discarded. Additionally, because of the noxious nature of mercury compounds, problems of atmospheric and stream polution are encountered by the disposal of the brine containing these mercury salts.

It is, therefore, apparent that, in both of these methods for the operation of an electrolytic flowing mercury cathode cell installation, it is very desirable to remove the mercury contaminant from the portion of the depleted brine effluent from the mercury cell which is not to be immediately resaturated and recycled into the cell.

Heretofore, it has been proposed to remove mercury from the depleted effluent brine from an electrolytic flowing mercury cathode cell by passing it in contact with a strongly basic anionic exchange quaternary ammonium type resin. In such a process, it is generally the practice to pass the depleted brine effluent through apparatus wherein the dissolved chlorine in the brine is expelled, prior to passing it in contact with the ion exchange resin. The strongly basic anion exchange quaternary ammonium type resins which can be used to adsorb the mercury, following dechlorination of the brine, are well-known, and are generally prepared by reacting a tertiary amine with an insoluble cross-linked copolymer made up predominantly of a mono vinyl aromatic hydrocarbon, such as styrene, and a lesser proportion of a divinyl aromatic hydrocarbon. These monomers are reacted to form copolymers, such as that of styrene and divinyl benzene, or a copolymer of styrene with ethyl vinyl benzene and divinyl benzene, the copolymer containing on its aromatic nuclei substituent haloalkyl, for example, halomethyl, groups, e.g., chloromethyl or bromomethyl groups, whereby an insoluble resinous quaternary ammonium salt is obtained upon condensation with the tertiary amine. By way of generalization, such cross-linked quaternary ammonium salts, or bases may be represented by the formula $R_4N^+Cl^-$ or $R_4N^+OH^-$, wherein the $R_4$ generally represents the hydrocarbon portion of the cross-linked polymer and the N represents the strongly anion quaternary ammonium nuclei in the resin whereas the $Cl^-$ and $OH^-$ represent the cationic portions corresponding to the strong anion nuclei.

The precise manner in which the strongly basic quaternary ammonium, cross-linked, resin polymer, adsorbs the mercury from the chlorine containing brine is not known, but with the suspected formation of a double salt or complex of the empirical formula, $Na_2HgCl_4$, it would be reasonable also to expect that the mechanism of the reactions involved in all probability follows the general pattern given in the following equations:

(I) $\quad Na_2HgCl_4 \rightleftharpoons 2Na^+ + HgCl_4^=$
(II) $\quad HgCl_4^= + 2(R_4N^+Cl^-) \rightarrow (R_4N^+)_2 \cdot HgCl_4^= + 2Cl^-$
(III) $\quad 2Na^+ + 2Cl^- \rightleftharpoons 2NaCl$ One of the problems faced by the prior art, and so far as is known at the present time from published literature, not successfully solved, is the recovery of the mercury from the elutriate from the strong anion exchange resin adsorption column wherein the mercury from the brine is adsorbed. Various elutriates such as strong acids, examples of which are sulphuric, phosphoric, and nitric, as well as strong bases have been proposed, and although each has its characteristic powers of elutriation of the mercury from the strong anion exchange resin, provision, so far as is known, has not heretofore been made for recovering the mercury from the elutriate in whatever form it may be contained therein. Because this problem has not previously been solved, the mercury in the elutriate, and otherwise unrecovered, represents a material loss in the operation of the cell, both from the standpoint of loss of mercury, and the cost of disposal of the elutriate, particularly in areas where atmospheric or surface water stream pollution is involved.

Accordingly, one of the objects of the present invention is to provide an economic means whereby mercury contained in the elutriate from a strong anion exchange resin adsorption column may be economically recovered.

Another object of the invention is to provide a means whereby there is established a closed system, of which the strong anion exchange resin adsorption column, and an electrolytic cell having a flowing mercury cathode are an integral part, whereby the mercury in such system is not permitted to escape the limits thereof in amounts which would be detrimental either to the economic operation of the system, or in terms of atmospheric or surface stream pollution.

These and other objects will be apparent to those skilled in the art from the description of the invention which is set forth hereinafter.

It is to be understood that, as used in the description of the invention and the claims which follow, the term "alkali metal" is intended to include sodium, potassium, and lithium, and also barium, and strontium, which latter two elements, although not normally referred to as alkali metals, have been found, in the present instance, to have similar characteristics. Similarly, the term "halide," as used hereinafter, is intended to include chlorides and bromides. Because of their low cost and ready availability, the preferred alkali metal halides for use in the present invention are sodium and potassium chloride and for this reason, primary reference will be made hereinafter to these materials. This is not, however, to be taken as limiting, but merely as being illustrative of the present invention.

Hence, pursuant to the above objects, the present invention is directed to an improvement in the method of recovering mercury from the effluent brine from an electrolytic, flowing mercury cathode cell, said effluent comprising primarily aqueous akali metal halide brines, preferably aqueous sodium and potassium chloride brines, by adsorptive contact with a strong anion exchange organic resin of the quaternary ammonium, cross-linked, type, which improvement includes elutriating said anion exchange resin containing adsorbed mercury compounds with an aqueous electrolyte, thereby to transfer said adsorbed mercury compounds to the elutriate, mixing said elutriate with an aqueous solution of chlorine in an alkali metal halide, the amount of chlorine provided in said solution being in stoichiometric excess of that required to convert the mercury compounds in said elutriate to mercuric chloride, and passing said brine, with the mercury contained therein, to the feed stream of an electrolytic, flowing mercury cathode cell, and passing an electric current through said cell so as to provide a cathodic charge at the surface of said flowing mercury.

As noted above, various elutriating agents may be employed in desorbing the adsorbed mercury compounds from the strong anion exchange quaternary ammonium resin, including strong acids, such as sulfuric acid, phosphoric acid, or nitric acid; however, it has been found in the course of the investigation leading up to the present invention that, rather than an acid, sodium sulfide, as an aqueous solution, is an extraordinarily efficient elutriate, and is the preferred elutriate for the purposes of the present invention. The reason for this preference is not without basis, in fact, since by the use of such a sodium sulfide solution, there is provided in contact with the mercury and the strong anion exchange quaternary ammonium base resin both sulfide ions, which will, with the mercury, form mercuric sulfide, and hydroxyl ions, which provide a means for regenerating the quaternary ammonium base resin to the basic or hydroxyl form. The mercury sulfide, and by this term it is intended to means the various sulfides of mercury such as mercurous sulfide, mercuric sulfide, the poly sulfides of mercury and mixtures thereof, is soluble or readily suspensible in the sodium sulfide elutriate, and further, upon contact of the mercury containing elutriate with chlorine dissolved in an aqueous sodium chloride or potassium chloride brine, the sulfide is converted to sulfate, and the mercury again converted to mercuric chloride, which, in the presence of a high concentration of chloride ion, is thought to form the double salt or complex noted under Reaction I above. The chlorinated elutriate in the brine, and containing the dissolved or suspended mercury, is then returned to the feed stream of the brine entering an electrolytic cell having a flowing mercury cathode, wherein the mercury in the brine is again plated out on the mercury cathode and thus recovered.

The method of the present invention may be more readily understood, and further elucidated in terms of the environment in which it may advantageously be used, by reference to the drawing attached hereto and made a part hereof, which drawing represents diagrammatically, a flowsheet of a process incorporating an electrolytic cell having a flowing mercury cathode, and the processing of the various by-products of electrolysis which stem therefrom. In the drawing the essential steps of the method of the present invention are outlined in an area founded by the discontinuous lines.

Referring now to the drawing, sodium chloride, or potassium chloride, is combined with water to form a substantially saturated brine which is introduced into an electrolytic cell having a flowing mercury cathode. Chlorine gas is evolved from the electrolytic cell and is passed to apparatus for the recovery of chlorine in a pure state. The flowing mercury cathode, having picked up sodium or potassium from the brine forming an amalgam, the amalgam is sent to a denuder for the purpose of recovering the sodium or potassium hydroxides, or other suitable compounds which may be obtained from the amalgam.

In the brine circuit, the main portion of the depleted brine from the flowing mercury cathode electrolytic cell with chlorine dissolved therein, as well as mercury in the form of the double salt or complex, noted hereinabove, is resaturated with solid salt, e.g., NaCl, and recycled to the mercury cell. A portion of the main stream of the depleted brine effluent from the cell is taken off as a side stream. This side stream may be the purge stream from which undesirable impurities are to be removed before the stream is recombined with the main depleted brine stream, prior to resaturation. This side or purge stream of depleted brine, like the main depleted brine stream, has chloride dissolved therein, as well as mercury in the form of the double salt or complex of mercury, and is passed to apparatus wherein the dissolved chlorine in the brine is evolved, which evolved chlorine is sent to apparatus for the recovery of chlorine in its purest state. In the operation of the present process, it has been found to be necessary to remove any free chlorine from the brine stream, prior to passing it in contact with the strong anionic exchange quaternary ammonium base resin, so as not to destroy the activity of this resin.

Following the dechlorination step, the brine is passed to the strong anion exchange quaternary base absorption column, wherein the mercury is adsorbed by a reaction which may be represented in accordance with Reaction II above. The dechlorinated brine containing the mercury in dissolved or suspended form is introduced into the anion exchange resin column until such time as the mercury in the effluent from the column suddenly rises, at which time the effluent stream is shut off, and the elutriant is then introduced into the column. As noted hereinabove, such elutriant is preferably sodium or potassium sulfide, corresponding to the brine initially fed to the electrolytic mercury cathode cell. The elutriant or regenerant sodium sulfide solution is preferably relatively concentrated, e.g., 2 N., and it will be found that, during the first part of the elutriation, or regeneration cycle, the effluent contains in suspended form a black precipitate of mercury sulfide and, as the mercury concentration in the solution is diminished by further adidtions of $Na_2S$ solutions, the precipitate dissolves and the solution assumes an overall light yellow color. In a sodium sulfide solution of this concentration the mercuric polysulfide is believed to be formed, and it is found that the polysulfide is soluble to the extent of about 16,800 p.p.m. as Hg at a pH of about 13 and at room temperature.

The flow rate of the elutriating, or regenerating medium, is preferably within the range of about 4 to 8 gallons per minute per square foot of column cross-section area, and the flow rate for the introduction of the dechlorinated brine to the anion exchange resin column is generally within this same range during the adsorption portion of the cycle.

In general, it will be found that the capacity of the anion quaternary ammonium base exchange resin, which may be of the type obtained by copolymerizing styrene with about 8% of divinyl benzene, and then forming the quaternary ammonium nuclei as noted hereinabove, will have a capacity for the removal of mercury from the sodium chloride or potassium chloride brine of the order of about 4 pounds of mercury per cubic foot of resin up to the point where the concentration of mercury in the effluent from the absorption column suddenly rises. It will be understood by those skilled in the art that this reference to capacity is intended to mean that the figure given for pounds per cubic foot is in terms of mercury (Hg), regardless of the chemical compound or complex in which the mercury is adsorbed in the anion exchange resin.

The elutriate from the anion exchange column, containing mercury sulfides in sodium sulfide or potassium sulfide solution, is then passed to a reactor which contains depleted brine from the electrolytic mercury cathode cell, which depleted brine may be the main stream of depleted brine or, alternatively, may be taken off as a second side stream from the main depleted brine stream. This depleted brine contains dissolved halogen, e.g., chlorine, in order to decompose the sulfides, including mercury sulfide, in the elutriate from the ion exchange resin, and thereby form mercuric chloride and/or the double salt or complex of mercuric chloride with either the potassium chloride or sodium chloride contained in the brine, as the case may be. From the reactor, the brine solution is returned to the brine resaturator wherein additional sodium chloride or potassium chloride is dissolved to the point of substantial saturation with respect to these salts, and from the brine resaturator the brine passes back again to the electrolytic cell for the recovery of mercury by plating out on the flowing mercury cathode.

As a further alternative, the entire stream of depleted brine from the cell may be passed to the resaturator, before a side stream is treated for the removal of mercury. After the depleted brine has been resaturated, a side or purge stream is taken off and passed through the dechlorinator and ion exchange resin for treatment in accordance with the present method. The sulfide elutriate from the ion exchange resin is then admixed with the chlorinated brine, e.g., the main brine stream, prior to the time it is resaturated. It is, thus, seen that the method of the present invention is applicable both to saturated brine, i.e., brine which has been resaturated, and to depleted brine.

During the adsorption cycle wherein the mercury containing brine is passed through the anion exchange quaternary ammonium resin adsorption column for the adsorption of mercury, the effluent is substantially free from Hg compounds, i.e., less than 0.01 p.p.m., and this effluent may be subjected to purification steps to remove undesirable impurities, such as Ca, Mg, Fe, and $SO_4^=$, before being recombined with the main depleted brine stream to be returned to the brine resaturator for combining with additional quantities of sodium chloride or potassium chloride to bring the concentration of the brine substantially to saturation, prior to passing the reconstituted saturated brine back to the electrolytic mercury cathode cell. Additionally, it is to be noted that, where the depleted brine is not recycled to the mercury cell but is discarded after one pass through the cell, the effluent from the ion exchange resin will simply be purged from the system to a sewer or drain. In this instance, of course, it is obvious that substantially all of the depleted brine effluent from the cell will be passed through the dechlorinator and the ion exchange resin bed, rather than only a small purge stream.

In order that those skilled in the art may better understand the operation of the present invention, the following specific examples are offered.

*Example 1*

In this example, dechlorinated brine, containing mercury as the complex $Na_2HgCl_4$, is passed through an anion exchange resin column of the type noted hereinabove until the mercury removal capacity of the resin is reached. Thereafter, the brine flow is discontinued and the resin elutriated, using a 2 N sodium sulfide solution as the elutriant. This procedure was then repeated several times with the following results:

| Cycle | Condition of Resin | Flow Rate, g.p.m./ft.$^2$ of Column Cross-Section | Capacity, # HG/ft.$^3$ Resin at Saturation Point | Elutriant | Elutriant Flow Rate, g.p.m./ft.$^2$ of Column Cross-Section | Percent Regeneration |
|---|---|---|---|---|---|---|
| 1 | Previously Unused Resin | 7.5 | 3.3 | 2 N $Na^2S$, 5 Liters. | 2.9 | 91 |
| 2 | 2nd Cycle | 4.3–6.3 | 4.0 | -----do--------- | 3.0 | 101 |
| 3 | 3rd Cycle | 4.5–7.0 | 3.9 | -----do--------- | 2.1 | 102 |
| 4 | 4th Cycle | 4.5–6.8 | 4.4 | 2 N $Na^2S$, 3 Liters. | 1.6 | 94 |

The extent of regeneration in Cycles 2 and 3 is believed to be due to incomplete regeneration in Cycle 1, the percent regeneration being a ratio of the total mercury content of the brine input to the anion exchange resin column, divided by the mercury content of the effluent from the column during elutriation.

*Example 2*

In order to show the effect of introducing a brine containing mercury, as the mercury chloride complex $Na_2HgCl_4$, into a cell, three runs were made. In these runs, the electrolysis of the brine was carried out in a one-foot square mercury cell, tilted at an angle of about 2° below the horizontal. A temperature of about 150° F. and cathode current density of about 2.55 amps/in.$^2$ were used during these runs.

In the first run, the NaCl brine initially fed to the cell contained substantially no mercury. Two depleted brine samples were taken during the course of the run, one after 60 minutes, and the second after 83 minutes. This was done to determine the normal concentration of mercury in the depleted brine.

In the second run, the initial concentration of mercury in the brine fed to the cell was about 30 p.p.m. in excess of the normal level in the brine, as determined by Run Number 1. Here again, two depleted brine samples were taken during the course of the run, the first after 30 minutes, and the second after 60 minutes.

In the third run, the brine feed for the cell was saturated with mercury or mecury chloride. Two depleted brine samples were taken during the course of the run, one after 36 minutes, and the second after 66 minutes.

Using this procedure, the following results were obtained:

| Run | Sample | NaCl (g.p.l.) | pH | Mercury (p.p.m.) |
|---|---|---|---|---|
| 1 | *1 | 313.3 | 5.50 | 0.12 |
|   | 2 | 284.4 | 2.30 | 6.4 |
|   | 3 | 283.0 | 2.33 | 5.7 |
| 2 | *1 | 315.0 | 4.90 | 37.0 |
|   | 2 | 277.3 | 2.40 | 23.0 |
|   | 3 | 280.8 | 2.40 | 18.0 |
| 3 | *1 | 313.5 | 4.23 | 1,940.0 |
|   | 2 | 284.4 | 3.83 | 830.0 |
|   | 3 | 284.5 | 3.60 | 870.0 |

*In each case, this sample is the inlet brine to the cell, while the other two samples are of the depleted brine removed from the cell. From these results, it is seen that, when the brine feed to the cell contains mercury in excess of that present in the brine during normal operation, i.e., about 7 p.p.m., the excess is removed from the brine by being plated on the mercury cathode. Thus, in the operation of the present method, the mercury recovered from the anion exchange resin and reintroduced into the cell is recovered within the cell by being plated on the mercury cathode.

*Example 3*

The elutriant recovered from the elutriation of the anion exchange resin, as set forth in Example 1, is admixed with a chlorinated, non-saturated NaCl brine, as is recovered from a flowing mercury cathode electrolytic cell. This brine has a NaCl content of about 270 grams/liter, and is saturated with $Cl_2$ at a temperature of 160° F., containing about 0.5 gram/liter of $Cl_2$. The spent 2 N $Na_2S$ elutriant is found to contain mercury, as HgS, in the amount of about 8 grams/liter. This elutriant is mixed with the chlorinated, depleted brine in an amount of about 1 part of elutriant to 30,000 parts of brine and the resulting mixture agitated so as to prevent any precipitation therefrom. Following this mixing, it is found that the HgS in the elutriant has been substantially all converted to a mercury chloride, analysis indicating this chloride to be a complex or compound having the empirical formula, $Na_2HgCl_4$.

It is to be understood that, although the invention has been described with specific reference to particular embodiments thereof, it is not to be so limited, since changes and alterations therein may be made which are within the full intended scope of this invention as defined by the appended claims.

What is claimed is:

1. A method of operating an electrolytic flowing mercury cathode cell for the electrolysis of alkali metal chloride brines, which comprises introducing a substantially saturated aqueous solution of an alkali metal chloride brine into a flowing mercury cathode cell, electrolyzing said brine in said cell to produce an alkali metal amalgam and chlorine, thereby depleting the alkali metal chloride content of said brine, removing the thus-depleted alkali metal chlorine brine from said cell, which brine contains dissolved chlorine and mercury impurities picked up from the flowing mercury cathode, resaturating the major portion of the thus-removed depleted alkali metal chlorine brine with alkali metal chloride, and returning the thus-resaturated main stream of alkali metal chloride brine to the flowing mercury cathode cell for electrolysis, removing, as a side stream, a portion of the depleted alkali metal chloride brine from the main stream prior to resaturation thereof, dechlorinating the said side stream of depleted brine, passing the thus-dechlorinated brine in adsorptive contact with a strong anionic exchange organic resin of the quarternary ammonium, cross-linked type, thereby adsorbing the mercury compounds contained in said brine on said anion exchange resin, elutriating said anion exchange resin containing adsorbed mercury compounds with an aqueous solution of sodium sulfide, thereby to transfer said adsorbed mercury compounds to the elutriator, mixing said elutriator with a portion of the main stream of depleted brine removed from said electrolytic flowing mercury cathode cell, said depleted brine having chlorine gas dissolved therein in an amount sufficient to provide a stoichiometric excess over that required to convert the mercury compounds in said elutriator to mercuric chlorides, passing the thus-obtained brine mixture, with the mercury contained therein, to the feed stream of the electrolytic, flowing mercury cathode cell, and passing an electric current through said cell so as to provide a cathodic charge at the surface of said flowing mercury and plate the mercury contained in said mixture on the surface of said cathode.

2. The method as claimed in claim 1 wherein the aqueous sodium sulfide solution has a normality of about 2.

3. The method as claimed in claim 1 wherein the alkali metal chloride is sodium chloride and the halogen is chlorine.

4. The method as claimed in claim 1 wherein the mixture of the elutriator from the anion exchange resin and the portion of the main stream of depleted brine containing dissolved chlorine is combined with the main stream of depleted brine prior to the resaturation thereof.

5. The method as claimed in claim 1 wherein the side stream of depleted brine, after passing in adsorptive contact with the anion exchange resin, is recombined with the main stream of depleted brine prior to the resaturation thereof.

6. The method as claimed in claim 3 wherein the side stream of depleted brine, after passing in adsorptive contact with the anion exchange resin and before elutriation, is purged from the brine feed stream system of the flowing mercury cathode cell.

7. The method as claimed in claim 1 wherein the depleted brine from the cell is resaturated prior to removing the side stream therefrom.

8. The method of treating an electrolytic mercury cell effluent which comprises contacting said effluent with an anion-exchange resin, elutriating such resin to separate in the elutriator the mercury from said resin, and treating said elutriator containing dissolved mercury compounds with chlorine to form reusable mercuric chloride in situ.

References Cited by the Examiner

UNITED STATES PATENTS

| 2,195,231 | 3/40 | Weder | 204—45 |
| 2,860,952 | 11/58 | Bergeron et al. | 75—81 |
| 2,885,282 | 5/59 | Neipert et al. | 75—121 |
| 3,029,144 | 4/62 | Karpink et al. | 75—121 |
| 3,085,859 | 4/63 | Scholten et al. | 23—134 |

FOREIGN PATENTS

| 595,813 | 4/60 | Canada. |

JOHN H. MACK, *Primary Examiner.*

MURRAY A. TILLMAN, *Examiner.*